(12) United States Patent
Akazawa et al.

(10) Patent No.: US 10,906,600 B2
(45) Date of Patent: Feb. 2, 2021

(54) TRAVELING APPARATUS

(71) Applicant: TOPY KOGYO KABUSHIKI KAISHA, Tokyo (JP)

(72) Inventors: Takuma Akazawa, Tokyo (JP); Shingo Tsukui, Tokyo (JP); Hidekazu Iwaki, Tokyo (JP); Koji Sakurai, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 230 days.

(21) Appl. No.: 16/311,899

(22) PCT Filed: Jul. 4, 2016

(86) PCT No.: PCT/JP2016/069783
§ 371 (c)(1),
(2) Date: Dec. 20, 2018

(87) PCT Pub. No.: WO2018/008060
PCT Pub. Date: Jan. 11, 2018

(65) Prior Publication Data
US 2019/0176913 A1 Jun. 13, 2019

(51) Int. Cl.
*B62D 55/02* (2006.01)
*B62D 55/08* (2006.01)
(Continued)

(52) U.S. Cl.
CPC .............. *B62D 55/02* (2013.01); *B60K 17/04* (2013.01); *B62D 55/065* (2013.01); *B62D 55/08* (2013.01)

(58) Field of Classification Search
CPC ...... B62D 55/02; B62D 55/065; B62D 55/08; B62D 55/24; B60B 19/00; B60B 19/003; B60B 19/12; B60B 19/125
(Continued)

(56) References Cited

U.S. PATENT DOCUMENTS 2,751,259 A * 6/1956 Bonmartini ............ B62D 55/28
305/44
6,179,073 B1 * 1/2001 Chhabra ................ B62D 55/08
180/6.7
(Continued)

FOREIGN PATENT DOCUMENTS

CA 2931721 A1 * 12/2016 ............. B62D 55/26
JP 63-270 B2 1/1988
(Continued)

OTHER PUBLICATIONS

English Translation of International Search Report PCT/JP2016/069783 dated Jul. 26, 2016.
(Continued)

*Primary Examiner* — Anne Marie M Boehler
(74) *Attorney, Agent, or Firm* — Jodi A. Reynolds, Esq.; Harter Secrest & Emery LLP

(57) ABSTRACT

A robot R includes a pair of crawler devices 2 supported by a body 1. Each of the crawler devices 2 includes a crawler unit 3 supported by the body 1 such that the crawler unit 3 is rotatable about a first rotational axis L. The crawler unit 3 includes a support 10 extending along the first rotational axis L1 and a pair of crawler parts 20A, 20B mounted on the support 10. Each of the crawler device 2 includes a rolling driving member 46 connected to the support 10 of the crawler unit 3, a rolling motor 60 that rotationally drives the rolling driving member 46, a crawler drive shaft 41 extending along the first rotational axis L1 through a gap between the pair of crawler parts 20A, 20B, a crawler motor 50 that rotationally drives the crawler drive shaft 41 and a torque transmitting mechanism 42 that transmits rotary torque of the crawler drive shaft 41 to the pair of crawler parts 20A, 20B, The crawler motor 50, as well as the rolling motor 60, is disposed outside of the crawler unit 3.

13 Claims, 8 Drawing Sheets

(51) Int. Cl.
  *B62D 55/065* (2006.01)
  *B60K 17/04* (2006.01)
(58) Field of Classification Search
  USPC .................................................. 180/9.1, 9.34
  See application file for complete search history.

(56) References Cited

U.S. PATENT DOCUMENTS

| | | | | |
|---|---|---|---|---|
| 9,540,060 | B2* | 1/2017 | Hutson | .................. G05D 17/02 |
| 10,427,733 | B2* | 10/2019 | Akazawa | ................ B62D 55/04 |
| 10,450,014 | B2* | 10/2019 | Akazawa | ................ B62D 55/04 |
| 2007/0145820 | A1 | 6/2007 | Hirose et al. | |
| 2009/0256280 | A1 | 10/2009 | Hirose et al. | |
| 2013/0062153 | A1* | 3/2013 | Ben-Tzvi | ............... B62D 55/04 |
| | | | | 192/71 |

FOREIGN PATENT DOCUMENTS

| | | | |
|---|---|---|---|
| JP | 2007-191153 A | 8/2007 |
| JP | 2009-241916 A | 10/2009 |
| JP | 2014-051221 A | 3/2014 |
| JP | 2014-193707 A | 10/2014 |

OTHER PUBLICATIONS

English Translation of International Preliminary Report on Patentability for PCT/JP2016/069783 dated Jan. 17, 2019.

* cited by examiner

TRAVELING APPARATUS

FIELD OF THE INVENTION

The present invention relates to a traveling apparatus that can be moved in two directions.

BACKGROUND OF THE INVENTION

The robot (traveling apparatus) disclosed in Patent Document 1 described below includes a pair of crawler devices extending in a front-rear direction of a body mounted on the left and right of the body. Each of the crawler devices includes front and rear wheels and a belt (endless elongated member) wrapped around the wheels.

The robot having the features mentioned above can be moved forward or backward by rotationally driving left and right crawler devices in a same direction at a same speed. The robot can make a turn to the left or right drawing a curve by driving the left and right crawler devices at different speeds. Moreover, the robot can make a pivot turn (turning in place without moving) by rotationally driving the left and right crawler devices in different directions.

The robot cannot change directions by pivot turning at a corner of a narrow passage curving at a right angle. The robot cannot change directions by pivot turning on an uneven ground either because a resistance of the ground interferes with the rotational driving of the crawler devices.

Patent Document 2 described below discloses a robot that can be moved in two directions and that can solve the problems mentioned above. The robot includes a pair of crawler devices extending in a first direction and spaced from each other in a second direction orthogonal to the first direction. Each of the crawler devices includes a crawler unit rotatable about a rotational axis extending in the first direction. The crawler unit includes a support extending in the first direction and a pair of crawler parts mounted on the support and opposed to each other with the rotational axis extending therebetween.

The robot of Patent Document 2 can be moved in the first direction by driving the crawler parts of the pair of crawler units. A mode of moving in this manner is referred to as "crawler moving" hereinafter.

Moreover, the robot can be moved in the second direction by the pair of crawler units being rotated about the rotational axes and rolling in the second direction. A mode of moving in this manner is referred to as "moving by rolling" hereinafter.

The robot of Patent Document 2 can change directions of movement from the first direction to the second direction and from the second direction to the first direction by selecting between the crawler moving and the moving by rolling without making a pivot turning.

PRIOR ART DOCUMENTS

Patent Documents

Patent Document 1: Japanese Unexamined Patent Application Publication No. 2007-191153
Patent Document 2: Japanese Unexamined Patent Application Publication No. 2009-241916

SUMMARY OF THE INVENTION

Problem to be Solved by the Invention

Arrangements of a crawler motor that rotationally drives a pair of crawler parts and a rolling motor that rotates a crawler unit about the rotational axis are not described in detail in Patent Document 2. However, from the description of the Patent Document 2, it can be inferred that the rolling motor is disposed outside of the crawler unit and the crawler motor is disposed inside the crawler unit.

In an arrangement where a crawler motor is disposed inside a crawler unit, a weight of the crawler unit is increased, and therefore, loads on the crawler motor and a rolling motor are increased. This makes the crawler motor easier to be damaged, requiring more maintenance. Dimensions of the crawler unit may be increased more than necessary.

Means for Solving the Problems

To solve the problems mentioned above, the present invention provides a traveling apparatus including a body; and at least a pair of crawler devices supported by the body and spaced from one another, wherein each of the pair of crawler devices includes a crawler unit supported by the body such that the crawler unit is rotatable about a first rotational axis extending in a direction orthogonal to a direction in which the crawler devices are spaced from each other, the crawler unit includes a support extending along the first rotational axis and a pair of crawler parts extending along the first rotational axis, the crawler parts mounted on the support spaced from each other with the first rotational axis extending therebetween, each of the crawler devices further includes: a rolling driving member supported by the body such that the rolling driving member is rotatable about the first rotational axis and connected to the support of the crawler unit; a rolling motor disposed outside of the crawler unit, the rolling motor rotationally driving the crawler unit about the first rotational axis by rotationally driving the rolling driving member; a crawler drive shaft supported by the body such that the crawler drive shaft is rotatable about the first rotational axis, the crawler drive shaft extending along the first rotational axis through a gap between the pair of crawler parts; a crawler motor disposed outside of the crawler unit, the crawler motor rotationally driving the crawler drive shaft; and a torque transmitting mechanism disposed inside the crawler unit, the torque transmitting mechanism transmitting rotary torque of the crawler drive shaft to the pair of crawler parts to rotationally drive the pair of crawler parts at a same time in a same direction.

According to the features mentioned above, weight and dimensions of the crawler unit can be reduced because the crawler motor is disposed outside of the crawler unit. This makes the crawler motor, as well as the rolling motor, less prone to failure, requiring less maintenance.

Preferably, each of the pair of crawler parts includes a pair of wheels disposed spaced from each other in the direction of the first rotational axis and an endless elongated member wrapped around the pair of wheels, and the pair of wheels are respectively supported by the support such that the wheels are rotatable about second rotational axes orthogonal to the first rotational axis, the second rotational axes being parallel to each other and extending in a direction in which the crawler parts are opposed to each other.

Preferably, the rolling driving member and the crawler drive shaft are disposed spaced from each other in the direction of the first rotational axis, the rolling driving member is connected to the support at one end portion of the crawler unit, and the crawler drive shaft is passed through the gap between the pair of crawler parts at the other end portion of the crawler unit.

Preferably, the support includes first and second shafts disposed spaced from each other in the direction of the first rotational axis, axes of the first and second shafts are provided as the second rotational axes, the first shaft supports the wheels at one end portions of the pair of crawler parts, the second shaft supports the wheels at the other end portions of the pair of crawler parts, the crawler drive shaft passes through the second shaft rotatably about the first rotational axis, and an inner end portion of the crawler drive shaft is connected to the torque transmitting mechanism at a point between the first and second shafts.

Preferably, the torque transmitting mechanism includes a first bevel gear fixed to the inner end portion of the crawler drive shaft and a second bevel gear fixed to the first shaft, the second bevel gear engageable with the first bevel gear, and the rolling driving member is connected to the first shaft such that the rolling driving member prohibits the first shaft from relatively rotating about the first rotational axis and the rolling driving member allows the first shaft to be rotated about the second rotational axis.

Preferably, the torque transmitting mechanism includes a first bevel gear fixed to the inner end portion of the crawler drive shaft and a second bevel gear engageable with the first bevel gear, the second bevel gear is fixed to one of the wheels of the pair of crawler parts supported by the second shaft and the rolling driving member is connected to the first shaft such that the rolling driving member prohibits the first shaft from relatively rotating about the first rotational axis and the rolling driving member allows the first shaft to be rotated about the second rotational axis.

Preferably, the rolling driving member is connected to the support at one end portion of the crawler unit, and the crawler drive shaft is passed through the gap between the pair of crawler parts at the one end portion of the crawler unit.

Preferably, the support includes first and second shafts disposed spaced from each other in the direction of the first rotational axis, axes of the first and second shafts are provided as the second rotational axes, the first shaft supports the wheels at one end portions of the pair of crawler parts, the second shaft supports the wheels at the other end portions of the pair of crawler parts, and an inner end portion of the crawler drive shaft is connected to the torque transmitting mechanism outside of the first shaft.

Preferably, the rolling driving member includes a plate part extending in the direction of the first rotational axis, the plate part is connected to the first shaft such that the plate part prohibits the first shaft from relatively rotating about the first rotational axis and the plate part allows the first shaft to be rotated about the second rotational axis, and a notch that receives the crawler drive shaft is formed in the plate part of the rolling driving member.

According to the features mentioned above, the rolling driving member that can be a weak point in the strength can be reinforced. Thereby, load bearing ability of the crawler unit can be enhanced.

Preferably, the torque transmitting mechanism includes a first bevel gear fixed to the inner end portion of the crawler drive shaft and a second bevel gear fixed to the first shaft, the second bevel gear engageable with the first bevel gear.

Preferably, the support includes a pair of side plates spacedly opposed to each other with the first rotational axis extending therebetween, the first and second shafts are laid over the side plates, and the rolling driving member is fixed to the pair of side plates.

Preferably, the at least one pair of crawler devices include two pairs of crawler devices, each of the crawler devices includes a rotary support supported by the body such that the rotary support is rotatable about a horizontal third rotational axis orthogonal to the first rotational axis and a flipper actuator that rotationally drives the rotary support, the crawler unit is rotatably supported by the rotary support, and the rolling motor and the crawler motor are disposed in the rotary support.

Preferably, the traveling apparatus further includes: a rolling rotation sensor that detects rotation of the rolling motor or the rolling driving member; a crawler rotation sensor that detects rotation of the crawler motor or the crawler driving shaft; and a controller that controls the rolling motor and the crawler motor, wherein the controller rotationally drives the crawler motor such that a rotational direction and a rotational speed of the crawler drive shaft are respectively same as a rotational direction and a rotational speed of the rolling driving member based on detected signals from the crawler rotation sensor and detected signals from the rolling rotation sensor when the controller rotationally drives the rolling motor.

According to the features mentioned above, crawler moving accompanying the driving of the rolling motor can be avoided, and the traveling apparatus can be moved in a direction orthogonal to the first rotational axis.

Advantageous Effects of the Invention

According to the present invention, weight and dimensions of the crawler unit of a traveling apparatus that can be moved in two directions can be reduced, making the traveling apparatus less prone to failure, requiring less maintenance.

MODE FOR CARRYING OUT THE INVENTION

A first embodiment of the present invention will be described hereinafter with reference to FIGS. 1 to 4. Direction X (first direction) and direction Y (second direction) orthogonal to each other are defined in FIGS. 1 and 2.

Figure 1:
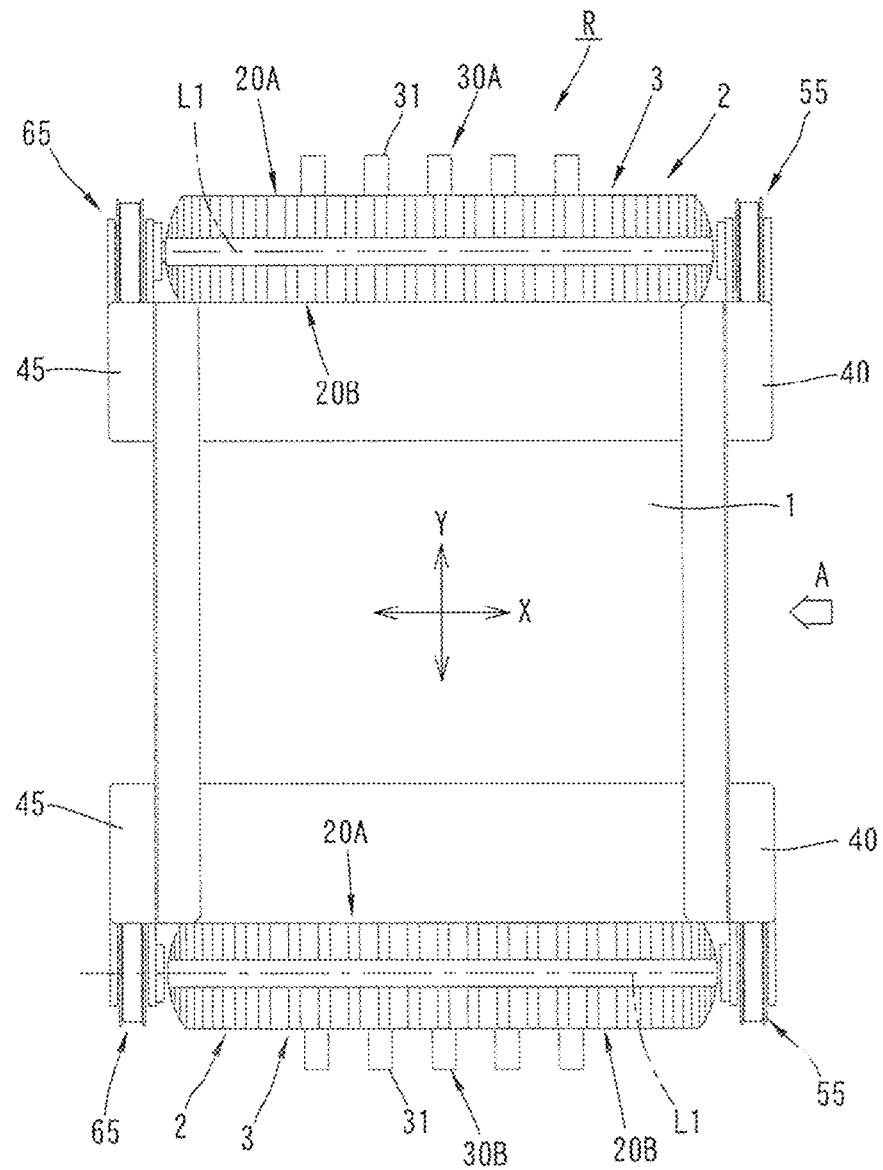
FIG. 1 is a schematic plan view of a robot according to a first embodiment of the present invention.
Figure 2:
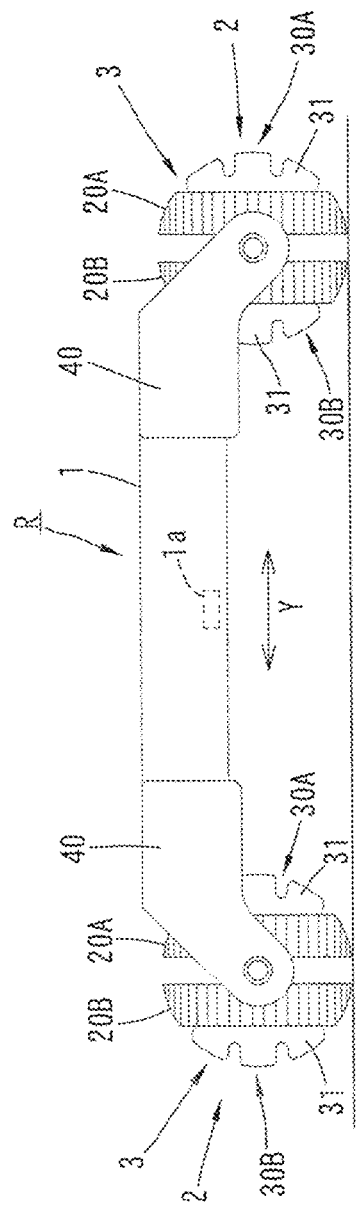
FIG. 2 is a schematic side view of the robot, viewed from direction A of FIG. 1.

A robot R (traveling apparatus) shown in FIGS. 1 and 2 is used for conveying baggage or the like. The robot R includes a body 1, a pair of crawler devices 2, 2 mounted on the body 1 and spaced from each other in the direction Y. The body 1 has a rectangular cross-sectional configuration. A controller 1a (shown only in FIG. 2) including a microcomputer that controls the crawler devices 2, 2 or the like, an interface (not shown), a transceiver (not shown) and a battery or the like (not shown) are housed in the body 1.

Each of the crawler devices 2 includes a crawler unit 3. The crawler unit 3 having an elongated circular cylindrical configuration extending in the direction X is supported by the body 1 such that the crawler unit 3 is rotatable about a first rotational axis L1 extending in the direction X as will be described later.

Figure 3:
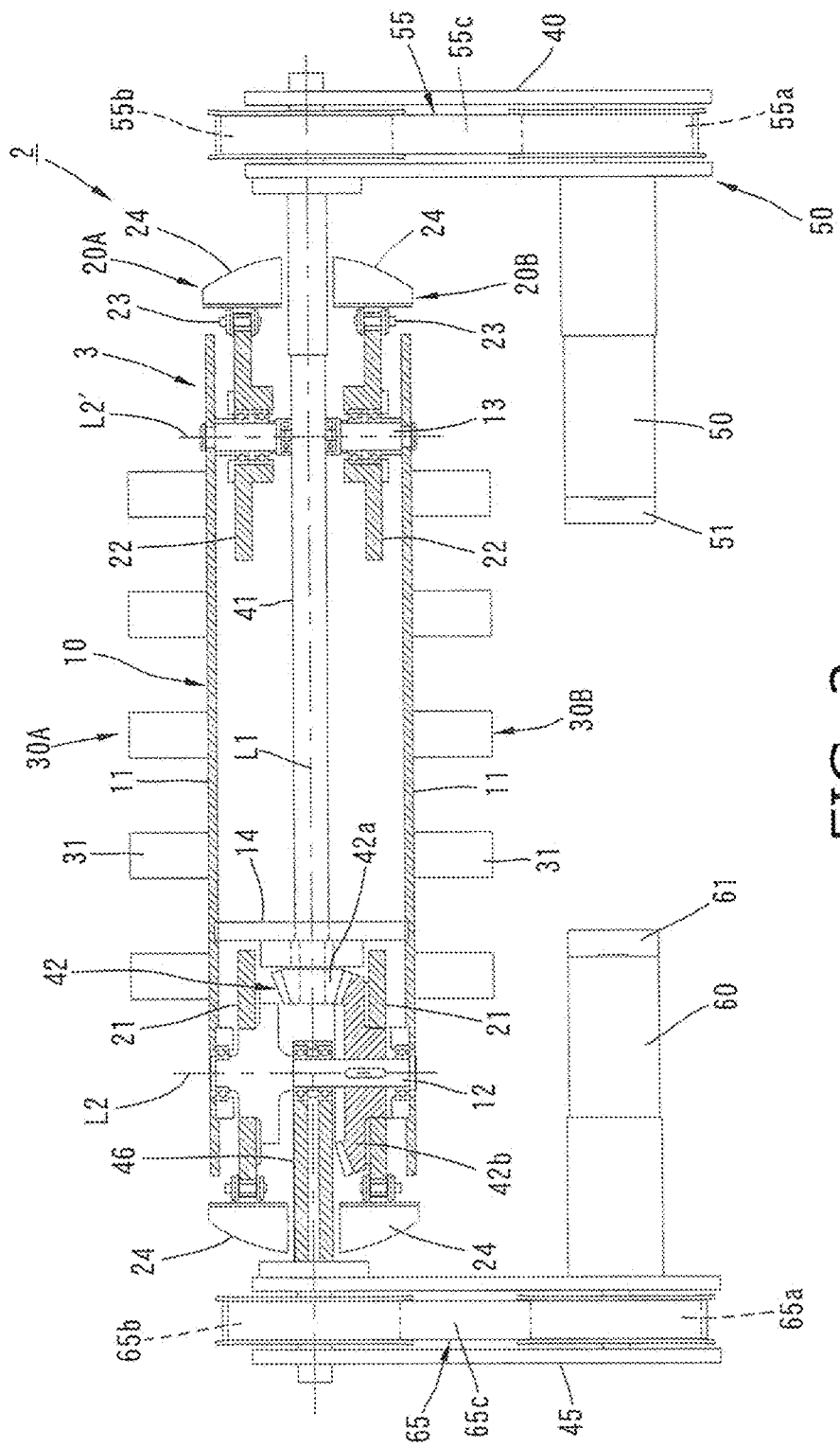
FIG. 3 is a plane cross-sectional view of a crawler device mounted on the robot.

As shown in FIG. 3, the crawler unit 3 includes a support 10, a pair of crawler parts 20A, 20B mounted on the support 10 and a pair of ground contacting structures 30A, 30B mounted on the support 10.

The support 10 includes a pair of elongated side plates 11, 11 extending in parallel to each other in the direction X (direction of the first rotational axis L1) and opposed to each other with the first rotational axis L1 extending therebetween. The support 10 also includes a first shaft 12 rotatably connected to one end portions of the side plates 11, 11, a second shaft 13 connected to the other end portions of the side plates 11, 11 and a support plate 14 fixed to intermediate portions of the side plates 11, 11.

Central axes L2, L2' of the first shaft 12 and the second shaft 13 extend in parallel to each other in a direction orthogonal to the first rotational axis L1. The central axes L2, L2' are respectively provided as rotational axes (second rotational axes) of sprocket wheels 21, 22 to be described later.

The pair of crawler parts 20A, 20B are disposed between the pair of side plates 11, 11 spaced from each other and opposed to each other with the first rotational axis L1 extending therebetween. Each of the crawler parts 20A, 20B includes sprocket wheels 21, 22 (wheels) spiced from each other in the direction of the first rotational axis L1, a chain 23 (endless elongated member) wrapped around the sprocket wheels 21, 22 and a lot of ground contacting members 24 made of rubber, for example, and fixed to the chain 23 at even intervals.

The sprocket wheel 21 of one crawler part 20A is directly fixed to the first shaft 12 and the sprocket wheel 21 of the other crawler part 20B is fixed to the first shaft 12 via a bevel gear 42b to be described later.

The sprocket wheels 22, 22 of the pair of crawler parts 20A, 20B are rotatably supported by the second shaft 13.

Each of the pair of ground contacting structures 30A, 30B includes a plurality (five in this embodiment) of ground contacting plates 31 spacedly arranged in the direction of the first rotational axis L1. The ground contacting plates 31 are made of rubber, for example, and fixed to outer surfaces of the side plates 11. The ground contacting plates 31 are protruded orthogonally from the side plates 11 in the direction of the second rotational axes L2, L2'.

As shown in FIG. 2, outer surfaces of the ground contacting members 24 of the pair of crawler parts 20A, 20B and outer surfaces of the ground contacting plates 31 of the pair of ground contacting structures 30A, 30B corporate to provide an outer periphery of the crawler unit 3 with a circular cylindrical configuration about the first rotational axis L1.

The ground contacting structures 30A, 30B provide the crawler unit 3 with a dead zone of a predetermined range in which the crawler unit 3 cannot make crawler moving.

In FIG. 3, a right end portion of the crawler unit 3 is supported by a bracket 40 fixed to the body 1 and a crawler drive shaft 41 such that the crawler unit 3 is rotatable about the first rotational axis L1. The crawler drive shaft 41 is supported by the bracket 40 such that the crawler drive shaft is rotatable about the first rotational axis L1. The crawler drive shaft 41 extends along the first relational axis L1. The crawler drive shaft 41 is rotatably supported by a support plate 14 in a vicinity of an inner end thereof. The crawler drive shaft 41 extends through the second shaft 13 via a bearing in an intermediate portion thereof. The second shaft 13 supports the crawler drive shaft 41 and is allowed to be rotated about the first rotational axis L1.

An inner end portion of the crawler drive shaft 41 disposed between the first shaft 12 and the second shaft 13 is connected to the first shaft 12 via a torque transmitting mechanism 42 disposed inside the crawler unit 3. The torque transmitting mechanism 42 includes a bevel gear 42a fixed to the inner end portion of the crawler drive shaft 41 and the bevel gear 42b engaged with the bevel gear 42a and fixed to the first shaft 12.

An outer end portion of the crawler drive shaft 41 is protruded from the crawler unit 3 and is connected to a crawler motor 50 via a torque transmitting mechanism 55. The crawler motor 50 is fixed to the bracket 40 and can be rotated in normal and reverse directions. A rotary encoder 51 (crawler rotation sensor) that detects rotation of the crawler motor 50 is attached to the crawler motor 50.

The torque transmitting mechanism 55 includes a timing pulley 55a fixed to an output shaft of the crawler motor 50, a timing pulley 55b fixed to the crawler drive shaft 41 and a timing belt 55c wrapped around the timing pulleys 55a, 55b.

A rotary torque of the crawler motor 50 is transmitted to the crawler drive shaft 41 via the torque transmitting mechanism 55, and to the sprocket wheel 21 of the crawler part 20B via the bevel gears 42a, 42b, and further to the sprocket wheel 21 of the crawler part 20A via the first shaft 12. Thereby, the pair of crawler parts 20A, 20B are driven at a same time in a same direction at a same speed.

In FIG. 3, a left end portion of the crawler unit 3 is supported by a bracket 45 fixed to the body 1 and a rolling driving shaft 46 (rolling driving member) supported by the bracket 45 such that the crawler unit 3 is rotatable about the first rotational axis L1. The rolling driving shaft 46 is supported by the bracket 45 such that the rolling driving shaft 46 is rotatable about the first rotational axis L1. The rolling driving shaft 46 extends along the first rotational axis L1. An inner end portion of the rolling driving shaft 46 is connected to the first shaft 12 via a bearing. In the connected state, the first shaft 12 and the rolling driving shaft 46 are not allowed to be relatively rotated with respect to each other about the first rotational axis L1, but the first shaft 12 is allowed to be rotated about the second rotational axis L2.

An outer end portion of the rolling driving shaft 46 is protruded from the crawler unit 3 and is connected to a rolling motor 60 via a torque transmitting mechanism 65. The rolling motor 60 is fixed to the bracket 45 and can be rotated in normal and reverse directions. A rotary encoder 61 (rolling rotation sensor) that detects rotation of the rolling motor 60 is attached to the rolling motor 60.

The torque transmitting mechanism 65 includes a timing pulley 65a fixed to an output shaft of the rolling motor 60, a timing pulley 65b fixed to the rolling driving shaft 46 and a timing belt 65c wrapped around the timing pulleys 65a, 65b.

When the rolling motor 60 is rotationally driven, a rotary torque of the rolling motor 60 is transmitted to the rolling driving shaft 46 via the torque transmitting mechanism 65. The rotary torque is further transmitted to the first shaft 12 of the support 10. Thereby, an entirety of the crawler unit 3 is rotated (rolling) about the first rotational axis L1.

Movement of the robot R by the pair of crawler devices 2, 2 will be described hereinafter. The controller 1a receives operation signals from a remote controller that is not shown and controls the crawler devices 2, 2. In each of the crawler devices 2, when the crawler motor 50 is driven with the pair of crawler parts 20A, 20B contacted with the ground, the crawler parts 20A, 20B are rotationally driven in the same direction at the same time as mentioned above. Thereby, the crawler device 2 can be moved in the direction X (crawler moving).

The robot R can be moved straight in the direction X by making the crawler motors 50, 50 of the pair of crawler devices 2, 2 rotated in a same direction at a same speed. The robot can be moved drawing a curve by making the crawler motors 50, 50 rotated at different speeds. Moreover, the robot R can make a pivot turn (turning in place without moving) by making the crawler motors 50, 50 rotated in opposite directions at the same speed.

When the rolling motor 60 of the crawler device 2 is driven, the crawler unit 3 is rotated (rolling) about the first rotational axis L1 as mentioned above. By the pair of crawler units 3 performing rolling at a same time in a same direction at a same speed, the robot R can be moved straight in the direction Y (moving by rolling).

By switching from one to the other of a crawler moving mode and a moving by rolling mode, the robot R can change a direction of movement 90 degrees without pivoting.

When only the rolling motor 60 is driven, the crawler parts 20A, 20B are rotated. The reason therefor is given below with reference to FIG. 3. When only the rolling motor 60 is driven, the crawler unit 3 is rotated about the first rotational axis L1. Accompanying the rotation of the crawler unit 3, the bevel gear 42b is revolved about the first rotational axis L1. As a result, the bevel gear 42b is rotated about the rotational axis L2 by engagement with the bevel gear 42a in a stopped state. Thereby, the first shaft 12 is rotated and the pair of crawler parts 20A, 20B are rotationally driven.

If only the rolling motor 60 is driven with the crawler motor 50 in a stopped state as mentioned above, the pair of crawler parts 20A, 20B are rotated, and the robot R moves obliquely instead of moving straight in the direction Y. To make the robot R move straight in the direction Y, the controller 1a performs a control routine shown in FIG. 4 for each of the crawler devices 2. The routine is performed from the start of moving.

In Step S1, information about a rotational speed and a rotational direction of the rolling driving shaft 46, in other words, a rotational speed and a rotational direction of the rolling of the crawler unit 3 is obtained based on detected signals from the rotary encoder 61.

In the next Step S2, a judgment is made whether the rotational speed of the rolling is zero or not. If the judgment is positive, the process goes back to Step S1. If the judgment is negative, the process proceeds to Step 3. In Step 3, a rotational speed and a rotational direction of the crawler drive shaft 4 is calculated based on detected signals from the rotary encoder 51. Driving of the crawler motor 50 is controlled so as to make the rotational speed and the rotational direction of the crawler drive shaft 41 same as the rotational speed and the rotational direction of the rolling obtained in Step S1.

The control mentioned above makes the crawler drive shaft 41 rotated synchronized with the rolling. Therefore, the pair of crawler parts 20A, 20B can be maintained at a stopped state and the robot R can be moved in the direction Y.

In the robot R having the features mentioned above, the crawler motor 50 is disposed outside of the crawler unit 3 as with the rolling motor 60. Therefore, compared with the prior art crawler unit having a crawler motor 50 housed therein, the crawler unit 3 can be reduced in weight and dimensions. The crawler motor 50 is less prone to failure, requiring less maintenance.

Moreover, a power cable connecting the crawler motor 50 and the battery does not require a slip ring for preventing torsion to be interposed therebetween. Furthermore, since a signal cable connecting the controller 1a and the rotary encoder 51 that detects the rotation of the crawler motor 50 does not require a slip ring either, the detected signals form the rotary encoder 51 can be transmitted to the controller 1a with a high degree of accuracy.

Other embodiments of the present invention will be described hereinafter with reference to the drawings. In the description of the other embodiments, same or similar reference numerals are used for features corresponding to those of the preceding embodiments, and detailed description thereof will be omitted.

Figure 5:
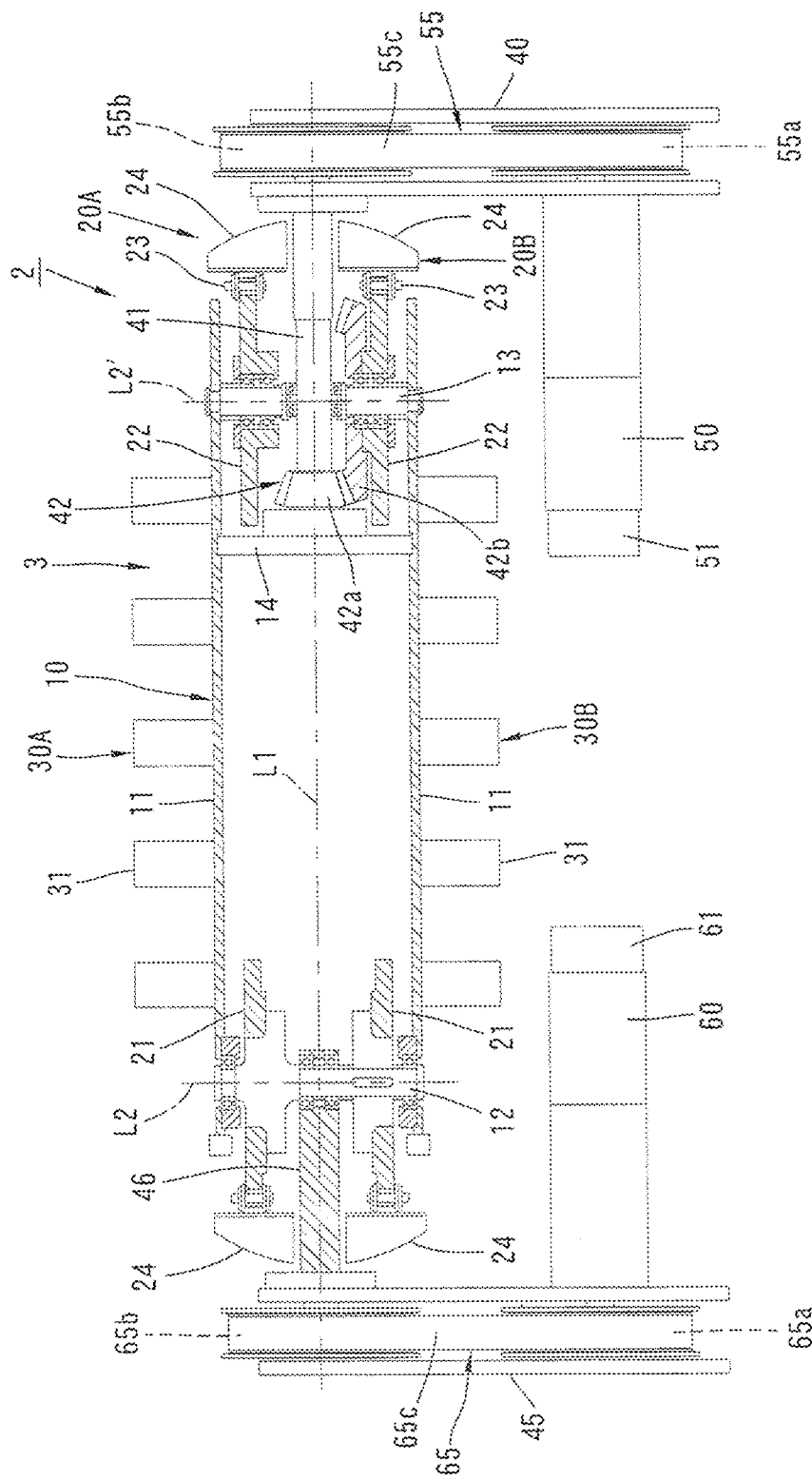
FIG. 5 is a plane cross-sectional view of a crawler device according to a second embodiment of the present invention.

In a second embodiment shown in FIG. 5, a crawler drive shaft 41 is shorter than the crawler drive shaft 41 of the first embodiment and an outer end portion thereof is rotatably supported by the bracket 40 and connected to a crawler motor 50. The crawler drive shaft 41 extends through a second shaft 13 and an inner end portion thereof is rotatably supported by a support plate 14 disposed in a vicinity of the second shaft 13.

The inner end portion of the crawler drive shaft 41 is connected to a sprocket wheel 22 of one crawler part 20B via a torque transmitting mechanism 42. A bevel gear 42a of the torque transmitting mechanism 42 is fixed to the inner end portion of the crawler drive shaft 41 and a bevel gear 42b is fixed to the sprocket wheel 22 of the crawler part 20B.

In the second embodiment, rotary torque of the crawler motor 50 is transmitted to the sprocket wheel 22 of the one crawler part 20B via a torque transmitting mechanism 55, the crawler drive Shaft 41 and the torque transmitting mechanism 42. The rotary torque of the crawler motor 50 is further transmitted to a sprocket wheel 21 via a chain 23 of the crawler part 20B, further transmitted to a sprocket wheel 21 of the other crawler part 21A via a first shaft 12 and further transmitted to the sprocket wheel 22 via a chain 23 of the crawler part 20A. In this manner, the crawler parts 20A, 20B are driven in a same direction at a same time.

Figure 4:
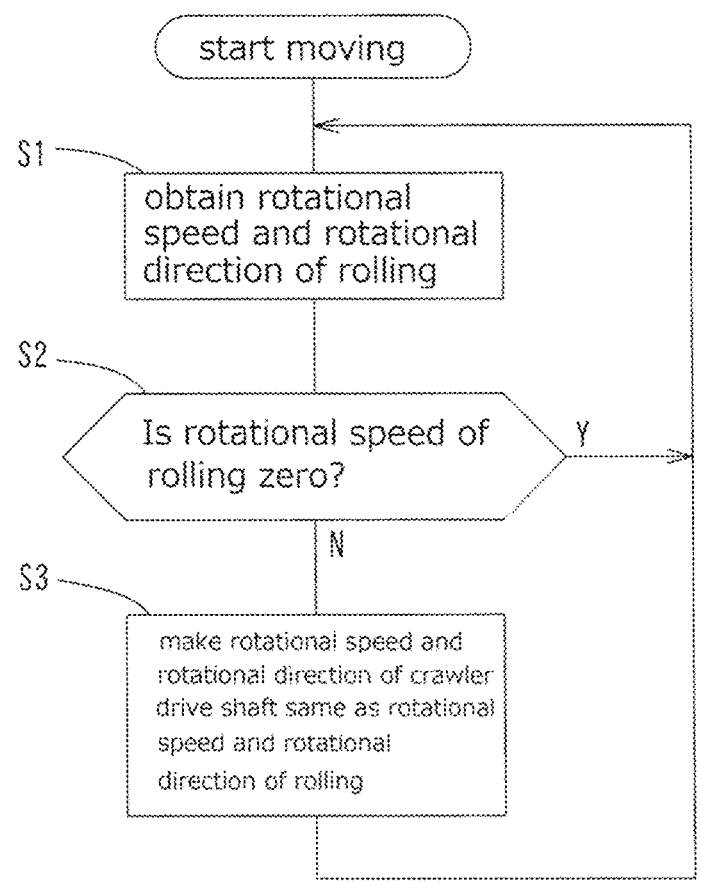
FIG. 4 is a flow chart of crawler motor control performed at a time of moving by rolling.

The control shown in FIG. 4 is also performed in the second embodiment.

Figure 6:
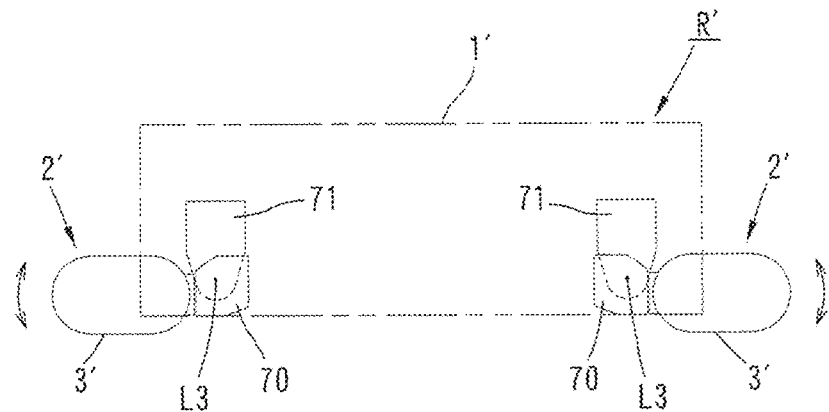
FIG. 6 is a schematic side view of a robot according to a third embodiment of the present invention.
Figure 7:
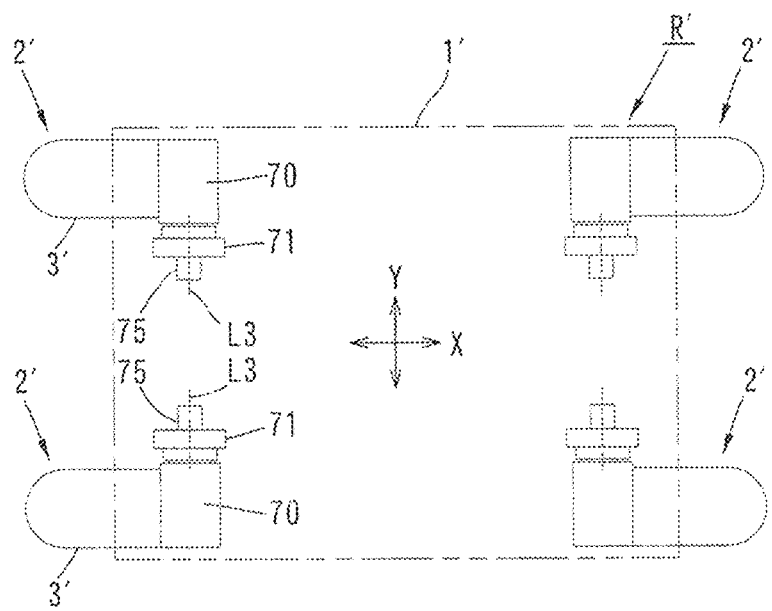
FIG. 7 is a schematic plan view of the robot of the third embodiment.

A third embodiment of the present invention will be described hereinafter with reference to FIGS. 6 to 9. As shown in FIGS. 6 and 7, a robot R' includes two pairs of flipper-type crawler devices 2' mounted on a body 1'.

One pair of crawler devices 2', 2' and the other pair of crawler devices 2', 2' are spaced from each other in a direction X (direction of a first rotational axis L1), The crawler devices 2', 2' of each pair are spaced from each other in a direction Y.

In the crawler device 2' of the third embodiment, one end portion of the crawler unit 3' is supported by a rotary support 70 and the other end portion of the crawler unit 3' is a free end.

The rotary support 70 is supported by a bracket 71 fixed to the body 1' such that the rotary support 70 is rotatable about a third rotational axis L3. The third rotational axis L3 extends in the direction Y in FIG. 7. The third rotational axes L3 of the pair of crawler devices 2' opposed to each other in the direction Y extend along a same straight line.

The rotary support 70 is rotated by a flipper motor 75 in normal and reverse directions about the third rotational axis L3. As a result, the crawler unit 3' is rotated in a vertical direction as indicated by arrows in FIG. 6. When the robot is moved forward and encounters an obstacle, the robot can be easily moved over the obstacle owing to the rotation of the crawler unit 3' in the vertical direction.

Figure 8:
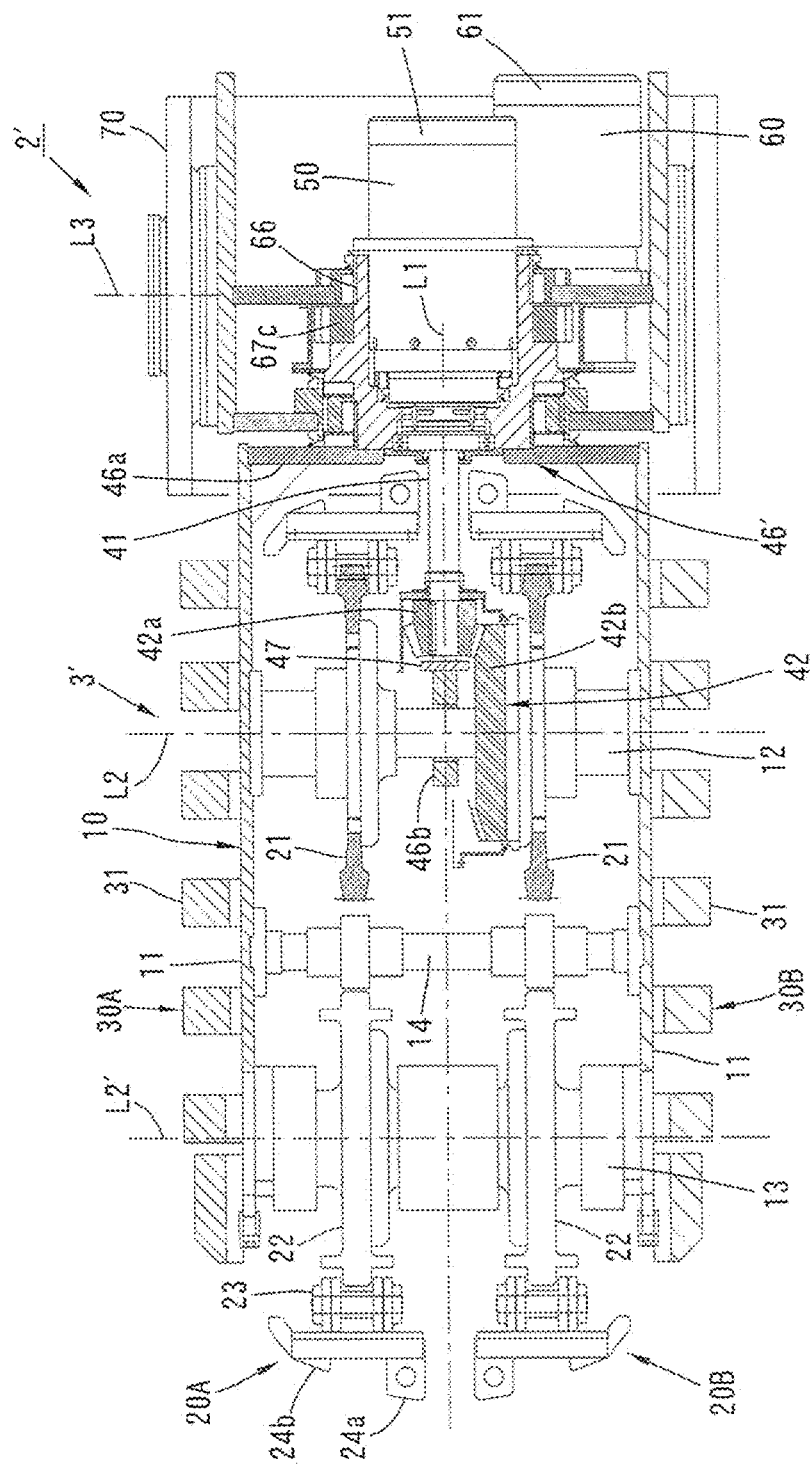
FIG. 8 is an enlarged plane cross-sectional view of a crawler device mounted on the robot of the third embodiment.
Figure 9:
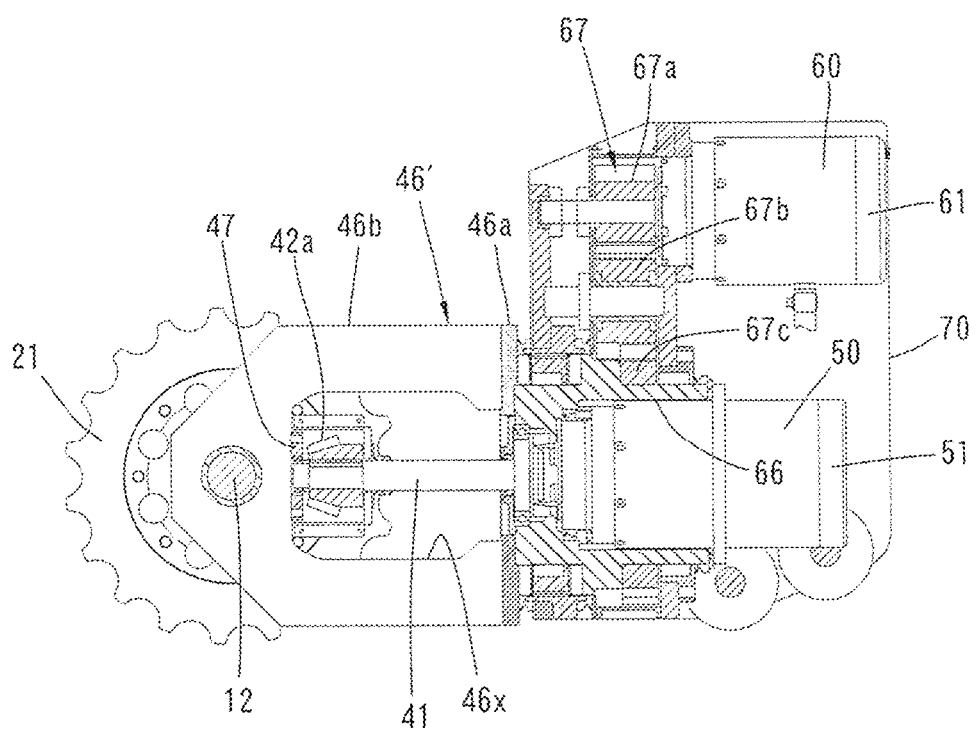
FIG. 9 is an enlarged sectional side view of a main portion of the crawler device of the third embodiment.

As shown in FIGS. 8 and 9, a crawler motor 50 and a rolling motor 60 are disposed in the rotary support 70. The rolling motor 60 is fixed to the rotary support 70 with a fixing structure that is not shown.

The crawler motor 50 is disposed on the first rotational axis L1 and an output shaft thereof is coaxially connected to a crawler drive shaft 41. An inner end portion of the crawler drive shaft 41 is disposed outside with respect to a first shaft 12 and connected to the first shaft 12 via a torque transmitting mechanism 42. A bevel gear 42a of the torque transmitting mechanism 42 is fixed to the inner end portion of the crawler drive shaft 41 and a bevel gear 42b is fixed to the first shaft 12.

Rotary torque of the crawler motor 50 is transmitted to the first shaft 12 via the crawler drive shaft 41 and the torque transmitting mechanism 42. Thereby, sprocket wheels 21 of a pair of crawler parts 20A, 20B fixed to the first shaft 12 are rotationally driven.

A rotary cylinder 66 extending coaxially with the crawler drive shaft 41 is rotatably supported by the rotary support 70. The crawler motor 50 is fixed inside the rotary cylinder 66. An output shaft of the rolling motor 60 extending parallel to the first rotational axis L1 is connected to the rotary cylinder 66 via a torque transmitting mechanism 67 composed of gears 67a, 67b, 67c.

A rolling driving member 46' is fixed to the rotary cylinder 66. The rolling driving member 46' includes a first plate portion 46a extending orthogonal to the first rotational axis L1 and fixed to a distal end surface of the rotary cylinder 66 and a second plate portion 46b fixed to the first plate portion 46a at a right angle.

The first plate portion 46a is fixed to a pair of side plates 11 of a support 10 of the crawler unit 3'. The second plate portion 46b extends through a gap between the pair of crawler parts 20A, 20B of the crawler unit 3'. The first shaft 12 extends through a distal end portion of the second plate portion 46b via a bearing. By arranging the rolling driving member 46' in this manner, a strength of the rolling driving member 46' can be enhanced, and thereby, a load bearing ability of the crawler unit 3' can be enhanced.

The first shaft 12 is allowed to be rotated about a second rotational axis L2.

Rotary torque of the rolling motor 60 is transmitted to the crawler unit 3' via the torque transmitting mechanism 67, the rotary cylinder 66 and the rolling driving member 46', and thereby, the crawler unit 3' is rotated about the first rotational axis L1.

When the rolling motor 60 is driven, the crawler motor 50 fixed to the rotary cylinder 66 is also rotated about the first rotational axis L1 and the crawler drive shaft 41 is rotated with the crawler unit 3'. Therefore, a drive control of the crawler motor 50 as shown in FIG. 4 is not required. Instead, it is required to interpose a slip ring in a power cable and a signal cable connected to the crawler motor 50.

A notch 46x is formed in the second plate portion 46b. The crawler drive shaft 41 is disposed in the notch 46x, and thereby, the crawler drive shaft 41 and the rolling driving member 46' are prevented from interfering with each other.

In the third embodiment, the rolling driving member 46' supports the crawler unit 3' at one end. An inner end of the crawler drive shaft 41 is rotatably supported by a support plate 47 fixed to the second plate portion 46b of the rolling driving member 46'.

In the third embodiment, two ground contacting lugs 24a, 24b spaced from each other in a circumferential direction are attached to a chain 23 in place of the ground contacting lugs 24 of the first embodiment.

In the third embodiment, the crawler motor 50 may be fixed to the rotary support 70 such that the crawler motor 50 is relatively rotatable with respect to the rotary cylinder 66 about the first rotational axis L1. In this case, the control shown in FIG. 4 is performed by a controller (not shown) disposed in the body 1', and thereby, moving by rolling in a direction orthogonal to the first rotational axis L1 can be done.

The present invention is not limited to the embodiments described above, and various modifications may be adopted.

The crawler part may be composed of a pair of wheels and a belt wrapped around the wheels and engaged with outer peripheries of the wheels by friction or by pin.

The ground contacting structure may be omitted. In this case, it is required to make an angular range occupied by ground contacting members of the crawler parts greater than those of the embodiments to provide the outer periphery of the crawler unit with the circular cylindrical configuration only by the pair of crawler parts.

The crawler rotation sensor may detect rotation of the crawler drive shaft. The rolling rotation sensor may detect rotation of the rolling driving member.

A clutch may be interposed between the crawler motor and the crawler drive shaft. In this case, the control shown in FIG. 4 is not required because the crawler motor and the crawler drive shaft are shut off by the clutch during the moving by rolling.

The robot can be moved in a generally straight line in an arbitrary oblique direction by performing the crawler moving and the moving by rolling at a same time.

INDUSTRIAL APPLICABILITY

The present invention may be applied to a robot or the like that can be moved in two directions.

The invention claimed is:
1. A traveling apparatus comprising:
a body; and
at least a pair of crawler devices supported by the body and spaced from one another, wherein
each of the pair of crawler devices comprises a crawler unit supported by the body such that the crawler unit is rotatable about a first rotational axis extending in a direction orthogonal to a direction in which the crawler devices are spaced from each other,
the crawler unit includes a support extending along the first rotational axis and a pair of crawler parts extending along the first rotational axis, the crawler parts mounted on the support spaced from each other with the first rotational axis extending therebetween,
each of the crawler devices further comprises:
a rolling driving member supported by the body such that the rolling driving member is rotatable about the first rotational axis and connected to the support of the crawler unit;
a rolling motor disposed outside of the crawler unit, the rolling motor rotationally driving the crawler unit about the first rotational axis by rotationally driving the rolling driving member;

a crawler drive shaft supported by the body such that the crawler drive shaft is rotatable about the first rotational axis, the crawler drive shaft extending along the first rotational axis through a gap between the pair of crawler parts;

a crawler motor disposed outside of the crawler unit, the crawler motor rotationally driving the crawler drive shaft; and a torque transmitting mechanism disposed inside the crawler unit, the torque transmitting mechanism transmitting rotary torque of the crawler drive shaft to the pair of crawler parts to rotationally drive the pair of crawler parts at a same time in a same direction.

2. The traveling apparatus according to claim 1, wherein each of the pair of crawler parts includes a pair of wheels disposed spaced from each other in the direction of the first rotational axis and an endless elongated member wrapped around the pair of wheels, and the pair of wheels are respectively supported by the support such that the wheels are rotatable about second rotational axes orthogonal to the first rotational axis, the second rotational axes being parallel to each other and extending in a direction in which the crawler parts are opposed to each other.

3. The traveling apparatus according to claim 2, wherein the rolling driving member and the crawler drive shaft are disposed spaced from each other in the direction of the first rotational axis, the rolling driving member is connected to the support at one end portion of the crawler unit, and the crawler drive shaft is passed through the gap between the pair of crawler parts at the other end portion of the crawler unit.

4. The traveling apparatus according to claim 3, wherein the support includes first and second shafts disposed spaced from each other in the direction of the first rotational axis, axes of the first and second shafts are provided as the second rotational axes, the first shaft supports the wheels at one end portions of the pair of crawler parts, the second shaft supports the wheels at the other end portions of the pair of crawler parts, the crawler drive shaft passes through the second shaft rotatably about the first rotational axis, and an inner end portion of the crawler drive shaft is connected to the torque transmitting mechanism at a point between the first and second shafts.

5. The traveling apparatus according to claim 4, wherein the torque transmitting mechanism includes a first bevel gear fixed to the inner end portion of the crawler drive shaft and a second bevel gear fixed to the first shaft, the second bevel gear engageable with the first bevel gear, and the rolling driving member is connected to the first shaft such that the rolling driving member prohibits the first shaft from relatively rotating about the first rotational axis and the rolling driving member allows the first shaft to be rotated about the second rotational axis.

6. The traveling apparatus according to claim 4, wherein the torque transmitting mechanism includes a first bevel gear fixed to the inner end portion of the crawler drive shaft and a second bevel gear engageable with the first bevel gear, the second bevel gear is fixed to one of the wheels of the pair of crawler parts supported by the second shaft and the rolling driving member is connected to the first shaft such that the rolling driving member prohibits the first shaft from relatively rotating about the first rotational axis and the rolling driving member allows the first shaft to be rotated about the second rotational axis.

7. The traveling apparatus according to claim 2, wherein the rolling driving member is connected to the support at one end portion of the crawler unit, and the crawler drive shaft is passed through the gap between the pair of crawler parts at the one end portion of the crawler unit.

8. The traveling apparatus according to claim 7, wherein the support includes first and second shafts disposed spaced from each other in the direction of the first rotational axis, axes of the first and second shafts are provided as the second rotational axes, the first shaft supports the wheels at one end portions of the pair of crawler parts, the second shaft supports the wheels at the other end portions of the pair of crawler parts, and an inner end portion of the crawler drive shaft is connected to the torque transmitting mechanism outside of the first shaft.

9. The traveling apparatus according to claim 8, wherein the rolling driving member includes a plate part extending in the direction of the first rotational axis, the plate part is connected to the first shaft such that the plate part prohibits the first shaft from relatively rotating about the first rotational axis and the plate part allows the first shaft to be rotated about the second rotational axis, and a notch that receives the crawler drive shaft is formed in the plate part of the rolling driving member.

10. The traveling apparatus according to claim 9, wherein the torque transmitting mechanism includes a first bevel gear fixed to the inner end portion of the crawler drive shaft and a second bevel gear fixed to the first shaft, the second bevel gear engageable with the first bevel gear.

11. The traveling apparatus according to claim 8, wherein the support includes a pair of side plates spacedly opposed to each other with the first rotational axis extending therebetween, the first and second shafts are laid over the side plates, and the rolling driving member is fixed to the pair of side plates.

12. The traveling apparatus according to claim 7, wherein the at least one pair of crawler devices include two pairs of crawler devices, each of the crawler devices includes a rotary support supported by the body such that the rotary support is rotatable about a horizontal third rotational axis orthogonal to the first rotational axis and a flipper actuator that rotationally drives the rotary support, the crawler unit is rotatably supported by the rotary support, and the rolling motor and the crawler motor are disposed in the rotary support.

13. The traveling apparatus according to claim 1, further comprising:

a rolling rotation sensor that detects rotation of the rolling motor or the rolling driving member;

a crawler rotation sensor that detects rotation of the crawler motor or the crawler driving shaft; and a controller that controls the rolling motor and the crawler motor, wherein the controller rotationally drives the crawler motor such that a rotational direction and a rotational speed of the crawler drive shaft are respectively same as a rotational direction and a rotational speed of the rolling driving member based on detected signals from the crawler rotation sensor and detected signals from the rolling rotation sensor when the controller rotationally drives the rolling motor.

* * * * *